(12) United States Patent
Okada et al.

(10) Patent No.: US 6,760,522 B2
(45) Date of Patent: Jul. 6, 2004

(54) OPTICAL CABLE HAVING FORMING TAPE AND RIP CORDS

(75) Inventors: Naoki Okada, Sakura (JP); Yoshio Hashimoto, Sakura (JP); Masayoshi Yamanaka, Sakura (JP); Michio Suematsu, Sakura (JP); Matsuhiro Miyamoto, Sakura (JP); Yoshiyasu Satoh, Sakura (JP); Koichiro Watanabe, Sakura (JP); Kazuo Hogari, Tsukuba (JP)

(73) Assignees: Fujikura Ltd., Tokyo (JP); Nippon Telegraph and Telephone Corporation, Tokyo (JP)

(*) Notice: Subject to any disclaimer, the term of this patent is extended or adjusted under 35 U.S.C. 154(b) by 84 days.

(21) Appl. No.: 10/106,470

(22) Filed: Mar. 25, 2002

(65) Prior Publication Data
US 2002/0159727 A1 Oct. 31, 2002

(51) Int. Cl.[7] .................................................. G02B 6/44
(52) U.S. Cl. .......................... 385/109; 385/110; 385/113
(58) Field of Search ................................. 385/109, 110, 385/111, 112, 113

(56) References Cited

U.S. PATENT DOCUMENTS

| 3,748,371 | A |   | 7/1973  | Krook et al. .............. 174/70 R |
| 5,642,452 | A | * | 6/1997  | Gravely et al. ............. 385/113 |
| 5,717,353 | A |   | 2/1998  | Fujimoto .................... 327/276 |
| 5,970,196 | A |   | 10/1999 | Greveling et al. ........... 385/114 |
| 6,101,305 | A | * | 8/2000  | Wagman et al. ............. 385/113 |
| 6,329,602 | B1 | * | 12/2001 | Ushiyama et al. ...... 174/137 R |
| 6,546,176 | B2 | * | 4/2003  | Anderson et al. ........... 385/113 |
| 6,566,606 | B1 | * | 5/2003  | Hazy et al. .............. 174/113 R |

FOREIGN PATENT DOCUMENTS

| EP | 0 916 980 | 5/1999 |           |
| EP | 1 006 384 | 6/2000 |           |
| JP |   137154  | 5/2000 | ............ G02B/6/44 |

OTHER PUBLICATIONS

Naoki Okada et al., "Development of New Dry Tube Cable with Water Blocking Laminated Tape", International Wite & Cable Symposium, Proceedings of the 49th, pp. 164–167.

* cited by examiner

Primary Examiner—Michael C. Zarroli
(74) Attorney, Agent, or Firm—Darby & Darby (57) ABSTRACT

The present invention's optical cable is provided with optical fibers, a forming pipe for housing the optical fibers, a sheath provided around the forming pipe, and at least one pair of rip cords embedded in the sheath. The forming pipe is formed of a plurality of tapes so that it is dividable along its longitudinal direction. When dividing the optical cable, the rip cords are pulled to tear open the sheath, and the already split forming pipe is divided while staying adhered to the respective parts of the sheath. As a result, the division of the sheath and the forming pipe is carried out in one stroke, so that the optical fibers inside the forming pipe can be exposed easily and quickly.

9 Claims, 5 Drawing Sheets

PRIOR ART

Fig. 9

OPTICAL CABLE HAVING FORMING TAPE AND RIP CORDS

BACKGROUND OF THE INVENTION

1. Field of the Invention

The present invention relates to an optical cable that can be divided later with improved ease.

2. Background Art

Figure 9:
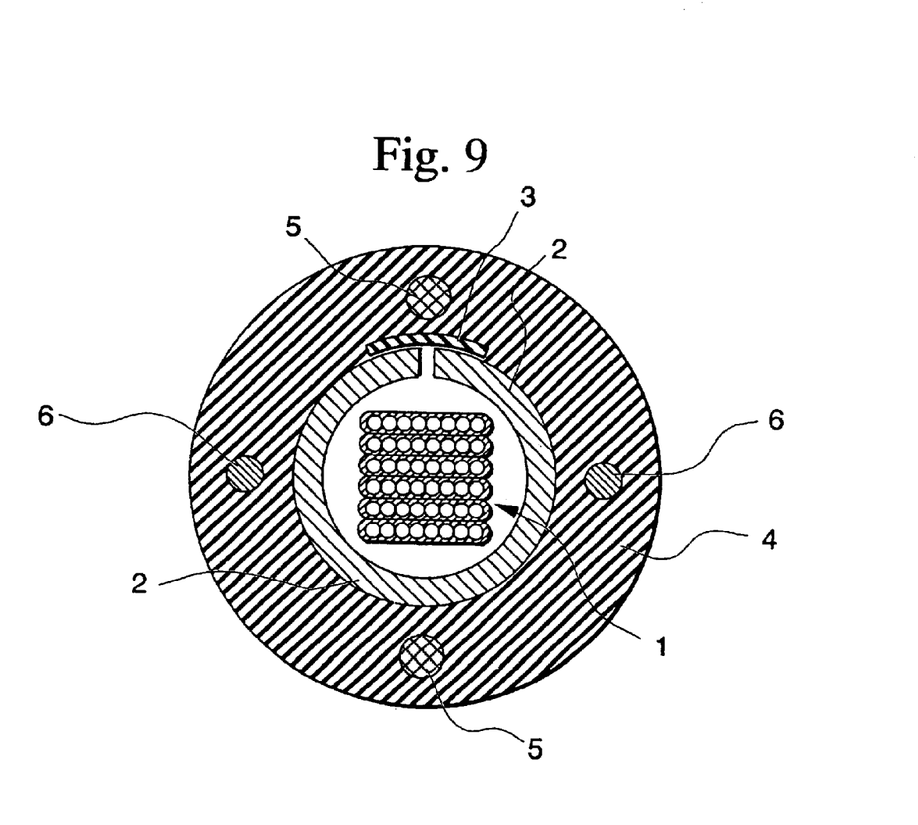
FIG. 9 is a schematic cross-sectional view showing a conventional optical cable.

An optical cable having a structure like that shown in FIG. 9 has been proposed recently.

In FIG. 9, numeral 1 indicates an optical ribbon core laminate in which multiple layers of optical fiber ribbon have been laminated together. This optical ribbon core laminate 1 is not fixed completely in place inside of the forming pipe 2, but rather is housed with an interval of spacing between itself and forming pipe 2.

This forming pipe 2 is formed into the shape of a pipe by employing a pipe forming method in which tape, consisting of a rigid plastic film like polyester, polypropylene, polyethylene, polyamide, or fiber reinforced plastic (FRP), is continuously fashioned into a pipe shape. The seams running along the longitudinal direction of this forming pipe 2 are then joined together by means of adhesive tape 3.

The forming pipe 2 is covered with a sheath 4 consisting of polyethylene or plasticizing polyvinyl chloride or the like. The formation of sheath 4 is carried out using the usual extruding and cladding method. In addition, two tension members 5, consisting of fiber-reinforced plastic or steel, brass or other such metal wire, and two rip cords 6, consisting of plastic cords, are embedded in the sheath 4. The tension members 5 are disposed opposite one another with the optical ribbon core laminate 1 interposed between them. Rip cords 6 are disposed opposite one another with the optical ribbon core laminate 1 interposed between them, and so as to be perpendicular to a line joining the two tension members 5.

In order to support and house the optical ribbon core laminate 1 within the forming pipe 2 without completely fixing it in place, an intermittent filling material (not shown) consisting of a soft hot-melt adhesive is employed to fill the optical cable at intermittent points along the longitudinal direction thereof.

When subsequently dividing an optical cable of this design, the sheath 4 is cut open by pulling both rip cords 6, thereby dividing the optical cable into two parts. However, it can be difficult to divide the forming pipe 2 due to its high resistance to tearing, or because it adheres to the sheath 4, for example. Thus, it can take some time to expose the optical ribbon core laminate 1 inside. In other words, this optical cable does not always demonstrate excellent subsequent dividing.

SUMMARY OF THE INVENTION

The present invention has as its objective to improve the ease with which an optical cable of the above-described design can be divided later.

This objective is achieved in an optical cable of the above design by enabling a forming pipe fashioned from a plurality of tape to be divided along its longitudinal direction.

In this case, it is preferable to provide rip cords near the seams of this forming pipe.

More preferably, indicators showing the position of the rip cord are formed to the outer periphery of the sheath provided around the forming pipe. These indicators are preferably projections, grooves or an indicator formed by printing or extrusion.

It is also preferable that the forming pipe be filled with hot-melt resin intermittently along its longitudinal direction.

Alternatively, it is desirable to provide a shock-absorbing material to the inner surface of the forming pipe. This shock-absorbing material is preferably one in which a non-woven fabric is adhered to the resin film, and a water absorbing powder is affixed to this non-woven cloth.

PREFERRED EMBODIMENTS OF THE PRESENT INVENTION

Preferred embodiments of the present invention will now be explained in detail using the accompanying figures. Note that parts which have the same structure or function as in the conventional optical cable shown in FIG. 9 will be assigned the same numeric symbol and an explanation thereof will be omitted.

Figure 1:
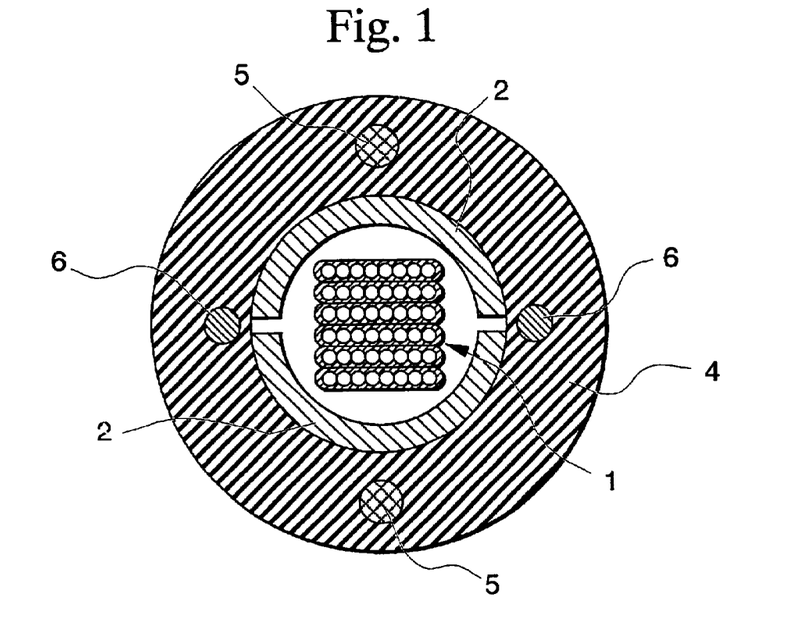
FIG. 1 is a schematic cross-sectional view showing an example of the optical cable according to the present invention.

FIG. 1 shows an example of the optical cable according to the present invention. The optical cable of this example differs from the conventional optical cable shown in FIG. 9 in that the forming pipe 2 can be divided in half along its longitudinal direction, there is no adhesive tape 3, and rip cords 6 are disposed inside of the sheath 4 near the seams of the dividable forming pipe 2.

The dividable forming pipe 2 is made by continuously fashioning two slightly narrow-width laminate tapes so that each has a semi-circular shape in cross section, and then apposing these together. The two seams of forming pipe 2 can simply face one another, may be slightly overlapped, or may face each other with a slight spacing in between. An adhesive tape such as used in a conventional forming pipe is not employed here, so that the forming pipe 2 can be easily divided into two pieces when subsequently dividing the optical fiber.

Production of an optical cable with this type of design is carried out in the following order. First, two pieces of laminate tape are continuously fashioned in a manner so as to have a semi-circular shape in cross-section. The two laminates are apposed and the optical ribbon core laminate 1 is inserted into the space between the laminates. The space is then intermittently filled with a filling material. Next, this assembly is relayed to the cross-head die of an extruder. By sending the tension members 5 and rip cords 6 into this cross head die, the forming pipe 2 in which the optical ribbon core laminate 1 is housed is covered with an extruded sheath 4, and the tension members 5 and rip cords 6 are embedded at specific positions in the sheath 4.

When subsequently dividing an optical cable of this design, the rip cords 6 are pulled to tear open the sheath 4. As a result, the forming pipe 2, which was already split into two pieces, is divided each part remaining adhered to the respective portions of the sheath 4. As a result, the division of the sheath 4 and forming pipe 2 is carried out in a single stroke, and the optical ribbon core laminate 1 in the inside of the forming pipe 2 can be exposed quickly and easily.

Moreover, since the adhesive tape employed in convention optical cables is not necessary, fabrication of the optical cable is simplified and production costs are reduced.

Figure 2:
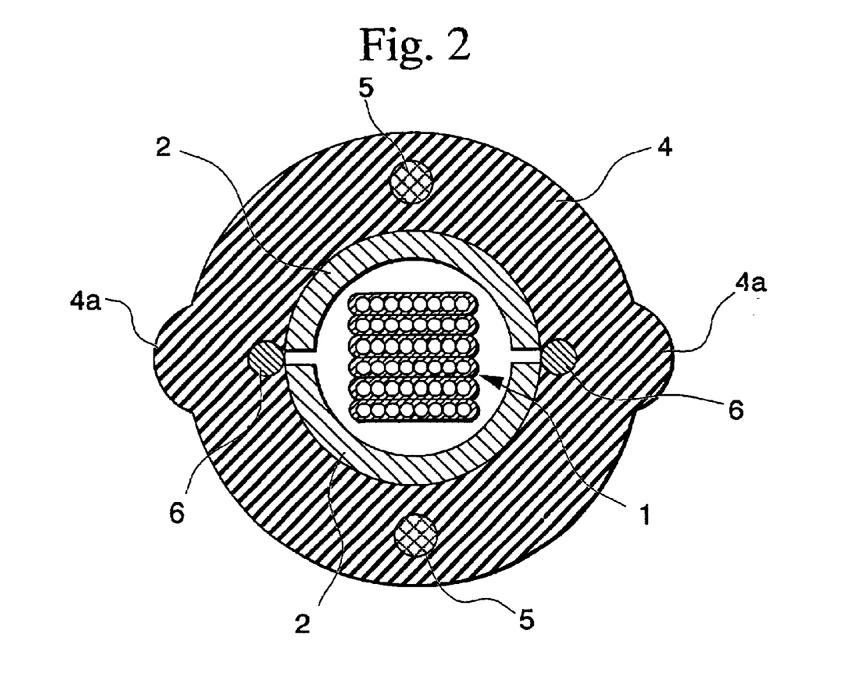
FIG. 2 is a schematic cross-sectional view showing another example of the optical cable according to the present invention.

FIG. 2 shows another example of an optical cable according to the present invention. The optical cable in this example has the same internal structure as the optical cable shown in FIG. 1. However, the rip cords 6 are disposed so as to be in contact with the seams of the dividable forming pipe 2. In addition, a pair of indicators 4a showing the positions of the rip cords 6 have been formed at symmetrical positions on either side of the rip cords 6 on the outer periphery of the sheath 4.

These indicators 4a are provided for showing the position of the rip cords 6. In the embodiment of FIG. 2, by evaginating a portion of the outer periphery of the sheath 4, a pair of projection are formed extending along the longitudinal direction of the optical cable.

In an optical cable of this design, the position of the rip cords 6 can be easily confirmed using the indicators 4a. In addition, by dividing the sheath 4 at the indicator 4a with a tool such as a cutter or the like, the rip cords 6 can be easily pulled out from the optical cable.

Furthermore, the indicators 4a form a projection that is thicker than the other parts of the sheath 4. Thus, even when the outer diameter of the rip cords 6 is increased, a decrease in the mechanical strength of the sheath 4 can be avoided due to the presence of the indicators 4a. As a result, this optical cable possesses excellent resistance to pressure and shocks.

Note that the indicators 4a are not limited to projections as described in this example. Rather, they may also be formed as grooves, may be printed or extruded on the outer periphery of the sheath 4, or may be in the form of lines marked in a different color. As a means of providing the indicators 4a marked in a different color using extrusion formation or the like on the outer periphery of the sheath 4, a method may be employed in which a pigment that is a different color from that of the main body of the sheath 4 is extruded along with the main body of the sheath 4, so that a unitary structure is formed.

In addition, when the tension members 5 having relatively large diameter are used, it is preferable that the outer periphery of the sheath 4 around the tension members 5 are evaginated in order to maintain the thickness of the sheath 4 which covers the tension members 5 to avoid the decrease in the mechanical strength of the sheath 4 without thicken the diameter of the optical cable. As a result, in the sheath 4 around the tension members 5, a pair of projection similar to the indicators 4a shown in FIG. 2 are formed extending along the longitudinal direction of the optical cable.

Figure 3:
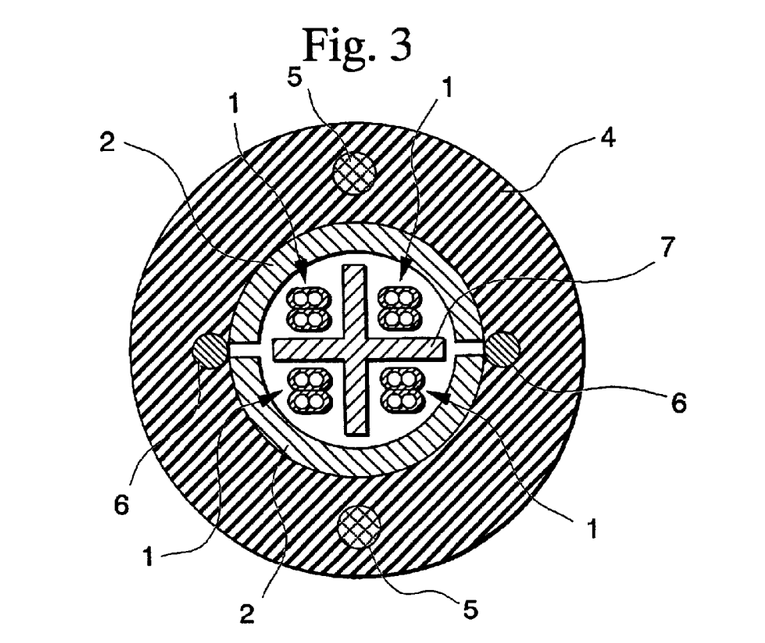
FIG. 3 is a schematic cross-sectional view showing another example of the optical cable according to the present invention.

FIG. 3 shows another example of an optical cable according to the present invention. In the optical cable shown in this example, the rip cords 6 are also disposed so as to be in contact with the seams of the dividable forming pipe 2. A spacer 7 which is in the shape of a cross in cross-section has also been provided in the inside of the forming pipe 2. The optical fibers are disposed in the grooves of this spacer 7. In addition, the spacer 7 grooves are twisted in one direction or in the SZ directions.

To be twisted in the SZ directions refers to repeatedly alternating the direction in which the groove runs between the S direction and the Z direction when creating a stranded wire by twisting metal wires, in the same manner as conventional SZ twisting.

By disposing the spacer 7 in the inside of the forming pipe 2, it is easy to recognize the optical fibers in the optical cable. In addition, since the spacer 7 is disposed in the inside of the forming pipe 2, there is no need to completely fix it in place as in a slot such as employed in the conventional slot-type optical cable. Thus, the optical cable can be made at low cost.

The shape of the spacer 7 is not limited to a cross in cross-section. Rather, the spacer 7 may also be shaped as a slot in which one or more grooves are formed in one direction or in the SZ direction in the outer peripheral surface of a cylindrically shaped synthetic resin rod.

Figure 4:
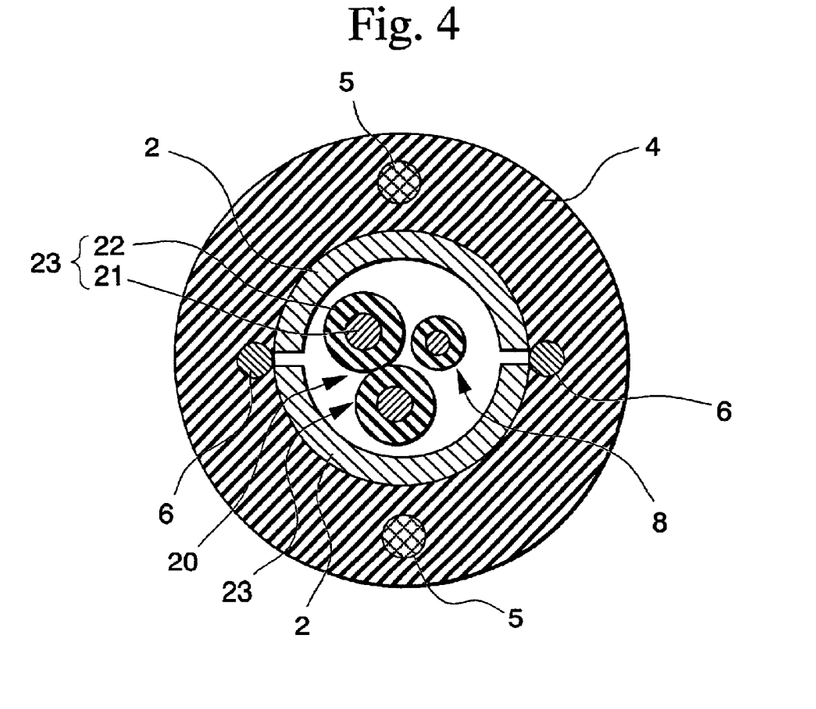
FIG. 4 is a schematic cross-sectional view showing another example of the optical cable according to the present invention.

FIG. 4 shows another example of an optical cable according to the present invention. In the optical cable of this example, the rip cords 6 are also disposed so as to come in contact with the seams of the dividable forming pipe 2. In addition, the optical fiber 8 and paired metal core wire 20 are housed in the inside of the forming pipe 2.

The paired metal core wire 20 are formed by two stripes of metal core wires 23, in which a conductor 21 is covered by an insulating member 22, with metal core wires 23 twisted together. Copper or aluminum wire may be employed for the conductor 21, with copper being optimally employed typically. Polyethylene, polyvinyl chloride and the like may be cited as examples of the insulating member 22, with polyethylene being preferably employed. It is also acceptable to employ four stripes of metal core wires twisted together, or two or more pairs of metal paired core wires for the paired metal core wire 20.

In addition, the optical fiber cores, optical fiber cords, optical fiber units or the like may be used for the optical fiber 8.

Figure 5:
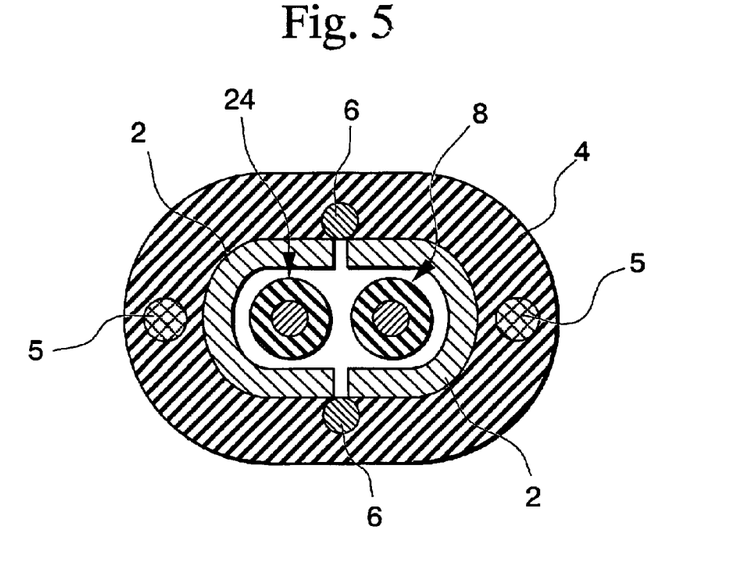
FIG. 5 is a schematic cross-sectional view showing another example of the optical cable according to the present invention.

FIG. 5 shows another example of an optical cable according to the present invention. In this example, the rip cords 6 are also disposed so as to be in contact with the seams of dividable forming pipe 2. The optical cable in this example is roughly an ellipse in cross-section, in which the circular form of the cable has been squashed perpendicular to the seams of the forming pipe 2. The optical fiber 8 and a coaxial cable 24 are housed in the inside of the forming pipe 2. Optical fiber cores, optical fiber cords, optical fiber units or the like may be used for the optical fiber 8 in this example as well.

When installing the optical fibers inside a building, other communications or power lines can be installed at the same time by creating a compound structure including the optical fiber, metal core wires, or the coaxial cables, as shown in FIGS. 4 and 5. Thus, improved labor efficiency and lower costs can be achieved.

Figure 6:
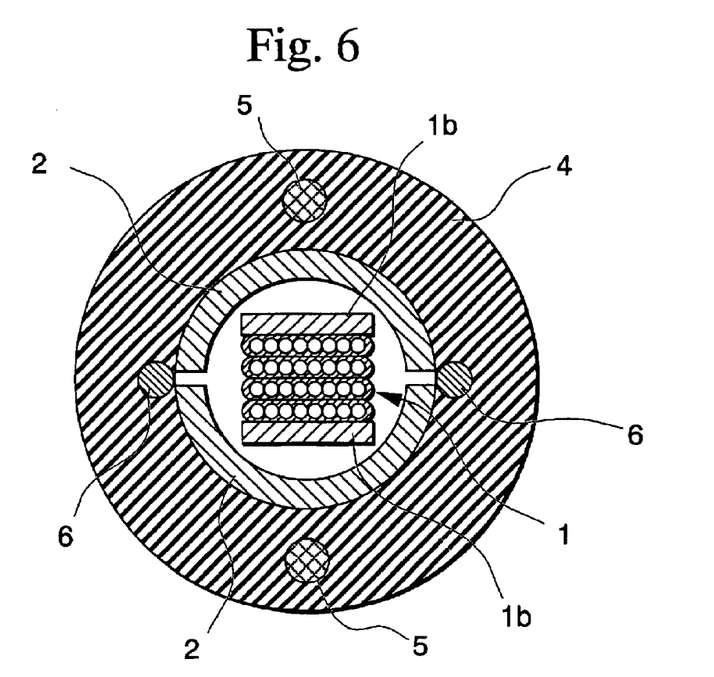
FIG. 6 is a schematic cross-sectional view showing another example of the optical cable according to the present invention.

FIG. 6 shows another example of an optical cable according to the present invention. In this example, the rip cords 6 are also disposed so as to be in contact with the seams of the dividable forming pipe 2. The outermost layers (the upper and lower layers in the figure) of the optical fiber ribbon core laminate 1 which is housed inside of the forming pipe 2 consist of water absorbent dummy ribbon cores 1b.

The dummy ribbon cores 1b are laminated onto the optical fiber ribbon core laminate 1, and are formed in a unitary manner with the optical fiber ribbon core laminate 1 during its formation. In addition, a water absorbent resin powder such as polyacrylic resin, polyvinyl alcohol resin, polyacrylamide resin, polyoxyethylene resin or the like, is adhered to the surface of the dummy ribbon cores 1b. As a result, water absorbency is provided to the dummy ribbon cores 1b from this water absorbent resin powder.

By providing the dummy ribbon cores 1b to the outermost layers of the optical fiber ribbon core laminate 1, the increase in transmission losses due to direct contact between the forming pipe 2 and the optical fibers disposed at the four corners of the optical fiber ribbon core laminate 1 can be decreased. Further, since the dummy ribbon cores 1b have water absorbent, the optical fiber possesses superior resistance to water.

In the above-described optical cables shown in FIGS. 1 through 6, a soft hot-melt resin, not shown in the figures, is employed to intermittently fill the forming pipe 2 along the longitudinal direction of the optical cable. By intermittently filling the forming pipe 2 with hot-melt resin in this way, the optical fibers and the like are supported at various sites along their length and can be housed in the forming pipe 2 without being completely fixed in place. By not completely fixing the optical fibers, etc. in place, subsequent division of the optical cable is easily accomplished.

Figure 7:
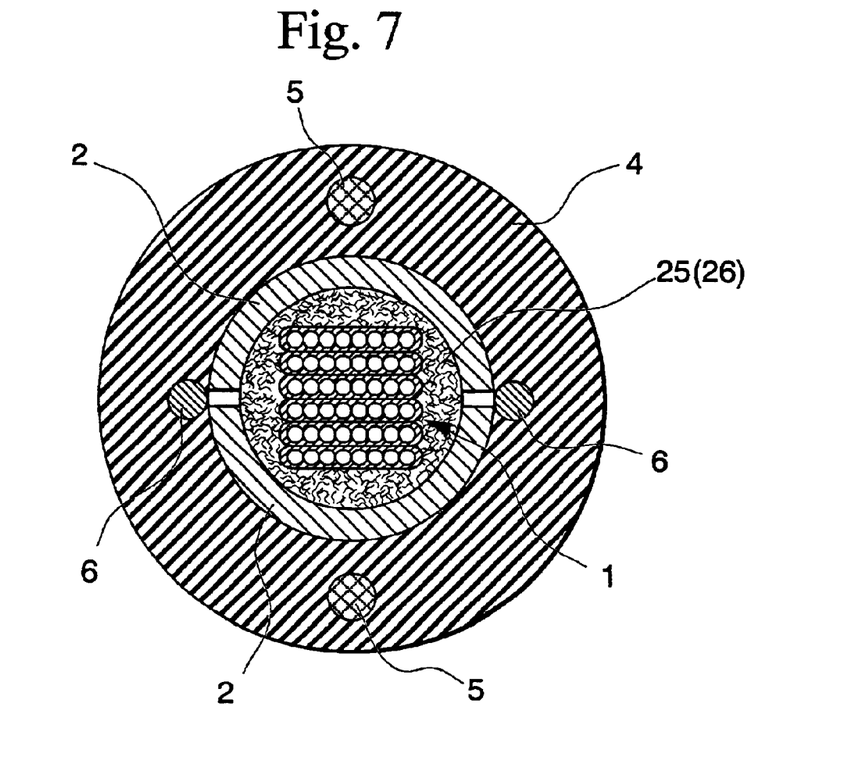
FIG. 7 is a schematic cross-sectional view showing another example of the optical cable according to the present invention.

FIG. 7 is a cross-sectional view showing another example of an optical cable according to the present invention. In this example, the rip cords 6 are also disposed so as to be in contact with the seams of the dividable forming pipe 2. Yarn 25 is employed as a shock-absorbing material used to fill the inside of the forming pipe 2. This yarn 25 is made by forming a water absorbent resin, such as polyethylene fiber, polypropylene fiber, polyacrylic resin, polyvinyl alcohol resin, polyacrylamide resin, polyoxyethylene resin, etc. into fibers, or by adhering these water absorbent materials to another type of fiber. Accordingly, the optical cable of this example has excellent resistance to water.

The yarn 25 surrounds the optical ribbon core laminate 1 and prevents breakage of the optical ribbon core laminate 1 from external force by restricting its movement in the inside of the forming pipe 2. By employing the yarn 25 in place of intermittent filling with a hot-melt resin, fabrication of the optical cable is simplified, production costs are lowered, and a superior design with respect to ease of subsequent division of the cable is achieved.

Alternatively, a shock-absorbing layer 26 may be provided on the inner surface of the forming pipe 2, with the optical ribbon core laminate 1 surrounded by this shock-absorbing layer 26.

Figure 8:
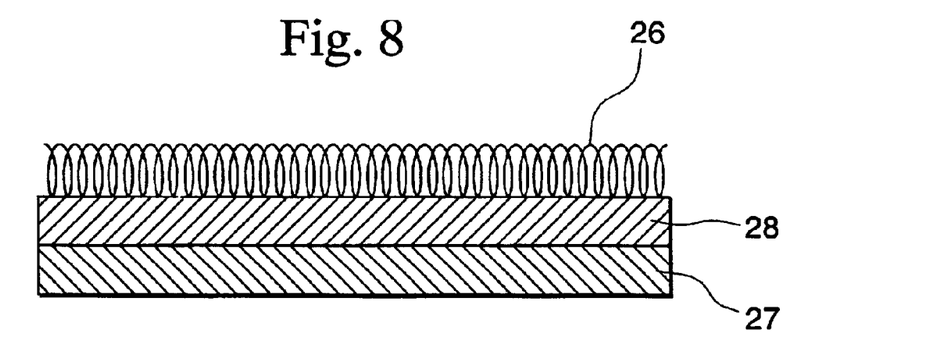
FIG. 8 is a schematic cross-sectional view showing an example of the laminate tape employed in the optical cable according to the present invention.

In this case, as shown in FIG. 8 for example, a design may be employed for the tapes comprising the forming pipe 2 in which a base 28 consisting of polyethylene terephthalate or the like is adhered on top of a laminate film 27, a non-woven fabric comprising shock-absorbing layer 26 is adhered to the base 28, and a water absorbing powder is affixed to this non-woven cloth. By creating a nap from the fibers, this shock-absorbing layer 26 is soft, highly effective at absorbing shocks, and water absorbent.

Note that the tapes may be comprised of the base alone, the base with a water absorbent powder adhered thereto, the base and a shock-absorbing layer in which the water absorbent powder is adhered to the shock-absorbing layer, or a laminate film adhered to these bases. By providing a laminate film, the forming pipe 2 and the sheath 4 undergo melt fusion to tightly adhere to one another when covering the forming pipe 2 with the sheath 4.

By using the shock-absorbing layer 26 to hold the optical ribbon core laminate 1 in the inside of the forming pipe 2 in this way, the optical ribbon core laminate 1 can be loosely fixed in place. As a result, the optical cable that is superior with respect to ease of subsequent division thereof is obtained. Moreover, since a hot-melt resin or other such intermittent filler is not needed here, fabrication is simple and costs are reduced. In addition, by providing the shock-absorbing layer 26 with water absorbency, the optical cable is obtained which has superior resistance to water.

In the examples shown in FIGS. 2 through 7, the rip cords 6 are disposed so as to be in contact with the seams of the forming pipe 2. Accordingly, the seams of the forming pipe 2 can be exposed by pulling the rip cords 6 and tearing open the sheath 4. The already split forming pipe 2 is divided while adhering to the respective parts of the sheath 4. As a result, the division of the sheath 4 and the forming pipe 2 is carried out in a single stroke, so that the optical cable core laminate 1 in the forming pipe 2 can be exposed easily and quickly.

Further, since the adhesive tape 3 employed in the conventional optical cable shown in FIG. 9 is not necessary here, the fabrication of the optical cable is simplified and production costs are reduced.

In the examples shown in FIGS. 3 through 7, it is acceptable to provide indicators to the outer periphery of the sheath 4 as in the example shown in FIG. 2.

Note that in the optical cables shown in FIGS. 1 through 8, the optical fiber housed inside of the forming pipe 2 is not limited to the optical ribbon core laminate 1. Rather, it is also acceptable to employ a single layer of optical fiber ribbon core, or an optical fiber aggregate in which multiple optical fibers have been gathered together.

The number of tapes comprising the forming pipe 2 is not limited to two. For example, it is also acceptable to form the cylindrical forming pipe 2 using three or more tapes, to enable division of the forming pipe 2 into three or more parts along its longitudinal direction.

The forming pipe 2 may also have a design in which a plurality of slightly narrow width, rigid tapes to which is adhered a water absorbent resin powder like polyacrylic resin, polyvinylalcohol resin, polyacrylamide resin, polyoxyethylene resin or the like, are employed and continuously fashioned into the shape of a cylinder. By using the forming pipe 2 having this type of water absorbency, it is not necessary to use an expensive water absorbent yarn for water-proofing the optical cable. Thus, a water repellant optical cable can be fabricated at low cost.

It is not absolutely essential that the rip cords 6 be positioned near the seams of the forming pipe 2. However, when the rip cords 6 are disposed at a position separated from the seams of the forming pipe 2, dividing the forming pipe 2 becomes somewhat troublesome. Accordingly, it is practical to dispose the rip cords 6 near the seams. In other words, in a design in which the rip cords are disposed near the seams of the forming pipe, division of the forming pipe is carried out at the same time as division of the sheath using the rip cords, so that the operation can be carried out quickly.

What is claimed:

1. An optical cable comprising:
   optical fibers,
   a forming pipe for housing said optical fibers,
   a sheath provided around said forming pipe, and
   at least one pair of rip cords embedded in said sheath, wherein:
   said forming pipe is formed of a plurality of tapes so as to be dividable at seams formed along the longitudinal direction thereof and
   a rip cord disposed near each said seam of said forming pipe.

2. An optical cable according to claim 1 wherein indicators showing the position of said rip cords are formed to the outer periphery of said sheath.

3. An optical cable according to claim 2 wherein said indicators are projections, grooves or indicators formed by printing or extrusion.

4. An optical cable according to claim 1 further comprising at least one pair of tension members embedded in said sheath.

5. An optical cable according to claim 1 further comprising a hot-melt resin that intermittently fills said forming pipe along the longitudinal direction thereof.

6. An optical cable according to claim 1 further comprising a shock-absorbing material provided to the inner surface of said forming pipe.

7. An optical cable according to claim 6 wherein a shock-absorbing material is provided to the inner surface of said forming pipe.

8. An optical cable comprising:
   optical fibers,
   a forming pipe for housing said optical fibers,
   a sheath provided around said forming pipe, and
   at least one pair of rip cords embedded in said sheath, wherein:
   said forming pipe is formed using a plurality of tapes so as to be dividable along the longitudinal direction thereof and wherein a hot-melt resin is used to intermittently fill said forming pipe along the longitudinal direction thereof.

9. An optical cable comprising:
   optical fibers,
   a forming pipe for housing said optical fibers,
   a sheath provided around said forming pipe, and
   at least one pair of rip cords embedded in said sheath, wherein:
   said forming pipe is formed using a plurality of tapes so as to be dividable along the longitudinal direction thereof and wherein a shock absorbing material is provided in the inner surface of the forming pipe, said shock-absorbing material is one in which a non-woven fabric is adhered to a resin film, and a water absorbing powder is affixed to the non-woven fabric.

* * * * *

UNITED STATES PATENT AND TRADEMARK OFFICE
CERTIFICATE OF CORRECTION

PATENT NO. : 6,760,522 B2
DATED : July 6, 2004
INVENTOR(S) : Naoki Okada et al.

It is certified that error appears in the above-identified patent and that said Letters Patent is hereby corrected as shown below:

<u>Title page,</u>
Please insert:
-- [30] Foreign Application Priority Data
    Apr. 26, 2001   (JP)   2001-130012 -- and please insert:
-- [*] Notice:  Subject to any disclaimer, the term of this patent is extended or adjusted under 35, U.S.C. 154(b) by 48 days. --

Signed and Sealed this

Thirty-first Day of May, 2005

JON W. DUDAS
*Director of the United States Patent and Trademark Office*